Patented Nov. 1, 1932

1,886,269

UNITED STATES PATENT OFFICE

RUFUS N. CHAMBERLAIN, OF CHICAGO, ILLINOIS, ASSIGNOR, BY MESNE ASSIGNMENTS, TO AMERICAN CONTAINER CORPORATION, OF ST. PAUL, MINNESOTA, A CORPORATION OF DELAWARE

COMPOSITION FOR BATTERY BOXES

No Drawing.    Application filed December 6, 1927.    Serial No. 238,239.

The invention relates to plastic compositions and has special reference to a composition of matter which will be impervious to water, resistant to the action of acids and capable of retaining its character under ordinary thermal conditions.

The principal object of the invention, generally stated, is to provide a composition of matter particularly well adapted for use in the manufacture of storage battery boxes or cells or other containers, articles or the like subjected to the action of acids.

Another object of the invention is to provide a composition embodying an asphaltum or bituminous base, an inert filler and a binder or fibrous organic material, the various ingredients and elements being so treated and combined as to produce a homogeneous composition which may be readily shaped or formed and which after fabrication into the desired article will possess strength, tenacity and resistance to shock and be, moreover, impervious to water and resistant to acids or other corrosive agents.

A more specific object of the invention is to provide a composition of this character embodying as an ingredient an inert filler which may consist of infusorial or diatomaceous earth such as occurs in nature in a more or less free condition though generally mixed with or embodied in clay and, in some instances, in intimate association with certain natural asphalts, this filler acting also somewhat as a binder on account of the faculty of the diatoms to interlink or lock not only with one another but also with whatever fibrous material is used to constitute the true binder.

A further object of the invention is to provide a novel treatment for the fibrous organic material whereby it may be thoroughly impregnated with the bituminous material and consequently made water and acid proof.

It is well known that in the fabrication of battery boxes and other articles subjected to the action of acids and which are required to have both mechanical and dielectric strength, it is necessary to utilize materials which are at least practically unaffected by acids. Usually compositions for the purpose contain bituminous material and a fibrous material of a mineral nature, for instance asbestos, but the cost of the last mentioned is high and its employment consequently greatly increases the expenses incident to production. It has been proposed to utilize certain organic fibers to constitute the binder but experimentation has disclosed that after prolonged exposure to acid a disintegration takes place seriously impairing the mechanical and dielectric strength. It is probable that the disintegration is due, at least in part, to the fact that in mixing organic fibers with the harder bitumens suitable for battery box manufacture, the fibers are simply superficially coated instead of being completely impregnated. This difficulty arises from the fact that if the temperature of the mixture is raised sufficiently to render the harder bitumens liquid, the heat would be sufficient to char the fibers, thus destroying their ability to act as a binder. If the soft type of bitumen is used, that is, the variety which melts at a lower temperature than the boiling point of water, the mixture is apt to remain too plastic and will not possess sufficient hardness to withstand the strains exerted upon it when such material is employed in the construction of storage battery boxes and the like. Another difficulty encountered is the finding of a suitable filler. It has been proposed to employ powdered clay, stone and the like but, for some reason or other, it is apparently impossible to incorporate more than a very limited proportion of such material within the bituminous base. It is this fact which principally distinguishes natural asphalt from the artificial. If a percentage of such filler is used in excess of a certain amount, the weight and bulk of the composition may of course be increased but the tensile strength is decreased.

In the course of my experiments I have discovered that by making use of a bituminous base formed as a blend of the hard and soft asphalts it is possible to impregnate the organic fibers completely as well as to coat them exteriorly. I have also discovered that by employing asphaltized silicates such as infusorial or diatomaceous earth occurring in nature in conjunction with natural asphalt, or mixed and associated artificially with suitable asphalt or other bituminous material, a composition will be produced which will have the desired weight and bulk without sacrificing strength, probably for the reason that the diatoms will themselves act to a certain extent as a binder on account of their peculiar shelly nature. In fact I have discovered that in this manner I can produce a new composition resembling but superior to the natural asphalts especially as the infusoriae are practically pure silica and consequently acid resistant.

In the actual carrying out of the invention I employ finely divided fibrous material which may be untreated wood passed through a suitable macerator, jute, cocoanut fiber, or the like, or which may be sulphide screenings, kraft pulp or similar fibers. If a long fiber is desirable, use may be made of shredded tamarack, jack pine or the like. Clearly, the employment of longer fibers is of benefit inasmuch as they will have greater binder properties. Regardless of which exact material is used, a quantity thereof is placed in a mixing machine which is suitably heated and there is added thereto a sufficient quantity of relatively soft asphaltum to impregnate and also coat the fibers. This soft asphaltum of low melting point may be first melted and added to the fiber in a fluid state or it may be melted in the mixer and the fibrous material added. The liquid asphaltum will readily impregnate the fibers to a certain extent but I have found that it is preferable to raise the temperature of the mixture above the boiling point of water so that the moisture and intercellular air within the fibers will be driven off. Upon subsequently lowering the temperature, which may be done positively or which may result as the transfer of the mixture from the mixer to another container, there will be a tendency to form a partial vacuum in the fibers on account of the previous expulsion of moisture and air and as a consequence the asphaltum will be actually drawn into the fibers and will impregnate them thoroughly. As asphaltum is naturally acid resisting, the fiber treated in this manner will possess the same qualities.

The base is bituminous and may consist of or comprise a relatively hard blown asphalt and gilsonite. Either the same or another mixer may be used for the treatment of the base and the temperature must of course be maintained at a sufficiently high degree to melt the asphalt and gilsonite to permit thorough and complete mixing with the impregnated acid resisting fiber obtained by the treatment above described.

It is probably immaterial whether the filler, to be described, be added to the base prior to or after the addition or intermixing of the fibrous material treated as described. Aside from this detail, the filler may consist of an asphaltized silicate such as is found in natural deposits in many parts of the world, or if those of the asphaltized variety are not available use may be made of diatomaceous, or infusorial earth added to the bituminous base in the proper proportions while the base is in a melted condition. When silicates are referred to the meaning is: those of the amorphous type and it is for this reason that special mention is made of the diatomaceous earth. Regardless of which sequence is followed in the addition of the various ingredients it is of course clear that they must be all thoroughly mixed by agitation or otherwise to effect a thorough commingling so as to produce a homogeneous mass which may be poured into molds, pressed or otherwise treated mechanically to form the battery boxes or other articles desired to be manufactured.

The materials used are readily obtainable and comparatively inexpensive especially as the wood fiber is a by-product of a large number of industries and as natural asphaltized silicates exist in large quantities in the U. S. The soft asphalt, hard asphalt and gilsonite are also readily obtainable commercial products. The proportions of hard to soft asphalt, the quantity of gilsonite and the degree of hardness of the hard asphaltum may be varied to suit the quantity and character of the filler used in order to produce the desired blend. While it is possible to omit the gilsonite, its employment has been found to improve the physical characteristics of the composition and also to improve the appearance of the finished product.

I have discovered that battery boxes constructed of this material made as described will be thoroughly acid resisting and will, moreover, be capable of withstanding severe shocks as the material possesses not only proper hardness but also great tenacity.

While I have described the preferred embodiment of the invention and have mentioned the specific ingredients which are highly suitable for the purpose and have also explained the successive steps by which the composition is made, it should be understood that I reserve the right to make all such changes in these particulars as will not depart from the spirit of the invention or the scope of the claims hereunto appended.

Having thus described the invention, I claim:

1. A composition of matter of the character described comprising a base of asphalt and gilsonite, a natural asphaltized siliceous filler and a binder of organic fibrous material impregnated with asphalt.

2. The steps in the method of making a moldable mixture of bitumens and vegetable fiber comprising: melting relatively low melting point bitumen and adding vegetable fiber at a temperature which will not scorch said fiber, melting relatively high melting point bitumen at a temperature which would ordinarily scorch or weaken said fiber, and then intermixing the fiber-containing bitumen with said bitumen of high melting point.

3. The steps in the method of making a moldable mixture of bitumens and vegetable fiber comprising: reducing low melting point bitumens to a substantially fluid state and adding vegetable fiber therein at such low temperature as will not materially weaken said fiber, melting higher melting point bitumen at such higher temperature as would weaken said fiber if it were present therein, and then intermixing the fiber-impregnating bitumen with said higher melting point bitumen whereby the fiber is protected to a substantial degree by being first coated with bitumen at a lower temperature.

4. The process of producing an asphalt composition which comprises placing together hard blown asphalt and gilsonite and diatomaceous earth and mxing the same in the presence of heat sufficient to melt the asphalts for completely coating the particles of diatomaceous earth with the asphalts, adding vegetable fiber to the mixture, and continuing the mixing until homogeneity of the three ingredients is attained.

5. The process of producing a moldable composition comprising melting a blend of hard blown asphalt and gilsonite, adding vegetable fiber and mixing the mass to obtain complete coating and impregnation of the fiber, and adding to and mixing with the mass diatomaceous earth to serve as a filler to give the resultant product hardness and body.

6. A process of making a moldable composition, comprising melting hard blown asphalt and gilsonite, adding vegetable fiber thereto and mixing to bring about complete coating, impregnation and dispersion of the fiber, adding diatomaceous earth and continuing the mixing in the presence of heat sufficient to melt the asphalts to produce a homogeneous mass.

In testimony whereof I affix my signature.

RUFUS N. CHAMBERLAIN.